United States Patent Office
3,213,147
Patented Oct. 19, 1965

3,213,147
PROCESS FOR THE PRODUCTION OF
α,ω-DINITROALKANES
Henry Feuer, Lafayette, Ind., and Roy S. Anderson, Bloomingdale, N.J., assignors to Purdue Research Foundation, Lafayette, Ind., a corporation of Indiana
No Drawing. Filed Jan. 16, 1963, Ser. No. 251,766
12 Claims. (Cl. 260—644)

Our invention relates to the preparation of nitroalkanes and more particularly to a process for the preparation of α,ω-dinitroalkanes from monopotassium α,α'-dinitrocyclic ketones.

Previously α,ω-dinitroalkanes have been prepared by the process described in U.S. Patent 2,963,515 issued to Henry Feuer and Christos Savides. In this process a dinitro salt of an alkane dinitrile such as an alkali or alkaline earth metal salt of an α,α'-dinitroalkane dinitrile is contacted with a base at an elevated temperature to form an α,α'-dinitrodicarboxylic acid salt. The salt is then cooled and treated with a weak acid to give the α,ω-dinitroalkane.

We have now discovered that monopotassium α,α'-dinitrocyclic ketones can be cleaved by contact with a strong mineral acid or a nucleophilic agent such as sodium thiosulfate, water, or a strong base to obtain an α,ω-dinitroalkane having one less carbon atom than the starting monopotassium α,α'-dinitrocylic ketone. Strong mineral acids which are useful for this purpose include nitric acid, hydrochloric acid, phosporic acid, sulfuric acid, etc. Bases which can be utilized in our process include the alkali metal hydroxides such as potassium hydroxide and sodium hydroxide, etc.

The monopotassium α,α'-dinitrocyclic ketones which can be used in our process generally include monopotassium α,α'-dinitrocyclic ketones having at least 5 carbon atoms. Among such compounds are monopotassium dinitrocyclopentanone, monopotassium dinitrocyclohexanone, monopotassium dinitrocyclooctanone, monopotassium dinitrocycloheptanone, etc., and the like. The monopotassium α,α'-dinitrocyclic ketones utilized in our process can be readily prepared by acidifying, preferably with glacial acetic acid, a dipotassium salt of a dinitrocyclic ketone such as those shown in U.S. Patent 2,868,838, issued to Henry Feuer and James W. Shepherd.

The α,ω-dinitroalkanes which can be prepared by our proces generally include those having at least 4 carbon atoms. Included among such dinitroalkanes are 1,4-dinitrobutane, 1,5-dinitropentane, 1,6-dinitrohexane, 1,7-dinitroheptane, etc, and the like.

Generally, in carrying out our process it has been found that in most instances, cleavage of the monopotassium α,α'-dinitrocyclic ketone is best accomplished by adding the strong mineral acid or the nucleophilic agent in amounts so as to give a reaction mixture having a pH of from about 3 to about 9. However, when monopotassium dinitrocyclopentanone is utilized as a reactant, a pH range of about 3 to about 8 is preferred. Also, in most instances, the use of a strong acid or a nucleophilic agent other than water is preferable to the use of water in our process. There is also no general preference for use of either a strong acid or a nucleophilic agent other than water with one exception. When monopotassium dinitrocyclopentanone is the reactant, a strong mineral acid gives results far superior to those accomplished when a nucleophilic agent is utilized.

Temperatures which can be utilized in our process cover a wide range and depend in part on the particular monopotassium α,α'-dinitrocyclic ketone used therein. Generally it is desirable not to exceed temperatures at which decomposition of either the reactants or the reaction product occurs. In most instances temperatures ranging from about −70° to about 85° C. are preferable for use in our process.

Generally the α,ω-dinitroalkanes produced by our process can be satisfactorily recovered directly from the reaction mixture at temperatures of from about −10 to about +10° C. A product of higher purity can be obtained by extraction first with ether and then recrystallization from ethanol.

The following examples serve to more fully illustrate our invention. It is not intended however, that our invention be limited to the particular reactants or reaction conditions set forth therein. Rather it is intended that all equivalents obvious to those skilled in the art be included within the scope of our invention as claimed.

*Example I*

To a 37-gram portion of potassium tertiary butoxide dissolved in 180 ml. of tetrahydrofuran was added an 8.4-gram portion of cyclopentanone dissolved in 120 ml. of tetrahydrofuran dropwise over a one-half hour period at −70° C. to form a mixture. At the end of the one-half hour period a 29.2-gram portion of amyl nitrate dissolved in 60 ml. of tetrahydrofuran was added to the mixture and the mixture was warmed to 10° C. and upon warming, a 21.78-gram portion of glacial acetic acid was added thereto. A crude potassium salt of dinitrocyclopentanone was precipitated and dried. The dried precipitate was then cooled to about 0° C. and a 13.2-gram portion of 85% potassium hydroxide dissolved in 200 ml. of distilled water was added thereto and the resulting mixture was warmed to room temperature and filtered. The temperature of the filtrate was then lowered to about 0° C. and to it was added a 13.2-gram portion of glacial acetic acid. The resulting product was then treated with methanol to precipitate monopotassium 2,5-dinitrocyclopentanone (18.7 grams).

*Example II*

To a 10.6-gram portion of the monopotassium 2,5-dinitrocyclopentanone produced in Example I was added 80 ml. of distilled water to form a mixture. The resulting mixture was then cooled to −10° C. and 5% sulfuric acid was added thereto to give a pH of 7. After a pH of 7 was obtained the pH of the mixture was adjusted to 3 with 30% sulfuric acid. The resulting mixture was then warmed to room temperature and held for 5 hours. The mixture was then extracted with 100 ml. of ether. The ether extraction procedure was twice repeated, the extracts were combined and then washed with cold 5% sodium bicarbonate solution. The resulting material was then concentrated to give a product weighing 5.43 grams. The product was then recrystallized from 95% ethanol to give 5.35 grams of 1,4-dinitrobutane (M.P. 32-33° C.) which represented a yield of 72% based on the starting cyclopentanone of Example I.

*Example III*

To a 26.4-gram portion of monopotassium 2,7-dinitrocycloheptanone was added 3.6 grams of potassium hydroxide dissolved in 60 ml. of water to give a mixture having a pH of 8. The mixture was held for 10 hours at room temperature and then cooled to about 0° C. to yield 2.95 grams of 1,6-dinitrohexane.

*Example IV*

The procedure of Example III was followed with the exception that water was utilized instead of potassium hydroxide to produce 1,6-dinitrohexane.

*Example V*

The procedure of Example III was followed with the exception that monopotassium 2,8-dinitrocyclooctanone was utilized instead of monopotassium 2,7-dinitrocycloheptanone to obtain 1,7-dinitroheptane.

*Example VI*

The procedure of Example III was followed with the exception that monopotassium 2,6-dinitrocyclohexanone was utilized instead of monopotassium 2,7-dinitrocycloheptanone to obtain 1,5-dinitropentane.

*Example VII*

The procedure of Example III was followed with the exception that monopotassium 2,9-dinitrocyclononanone was utilized instead of monopotassium 2,7-dinitrocycloheptanone to obtain 1,8-dinitrooctane.

*Example VIII*

The procedure of Example III was followed with the exception that monopotassium 2,10-dinitrocyclodecanone was utilized instead of monopotassium 2,7-dinitrocycloheptanone to obtain 1,9-dinitrononane.

Now having described our invention, what we claim is:

1. A process for the production of $\alpha,\omega$-dinitroalkanes having not less than 4 carbon atoms which comprises contacting a monopotassium $\alpha,\alpha'$-dinitrocyclic ketone with a compound selected from the group consisting of a strong mineral acid, water, sodium thiosulfate and alkali metal hydroxide and their mixtures, and recovering the $\alpha,\omega$-dinitroalkane.

2. A process for the production of $\alpha,\omega$-dinitroalkanes having not less than 4 carbon atoms which comprises contacting a monopotassium $\alpha,\alpha'$-dinitrocyclic ketone having not less than 5 carbon atoms with a compound selected from the group consisting of a strong mineral acid, water, sodium thiosulfate, and an alkali metal hydroxide and their mixtures, to obtain a reaction mixture having a pH of from about 3 to about 9 and recovering the produced $\alpha,\omega$-dinitroalkane.

3. The process of claim 2 wherein the strong mineral acid is selected from the group consisting of hydrochloric acid, sulfuric acid, nitric acid, and phosphoric acid.

4. The process of claim 2 wherein the alkali metal hydroxide is selected from the group consisting of sodium hydroxide and potassium hydroxide.

5. A process for the production of $\alpha,\omega$-dinitroalkanes having not less than 4 carbon atoms which comprises contacting a monopotassium $\alpha,\alpha'$-dinitrocyclic ketone having not less than 5 carbon atoms with a compound selected from the group consisting of a strong mineral acid, water, sodium thiosulfate, and an alkali metal hydroxide and their mixtures at temperatures ranging from about $-70°$ C. to about 85° C. to obtain a reaction mixture having a pH of from about 3 to about 9 and recovering the thus produced $\alpha,\omega$-dinitroalkane.

6. The process of claim 5 wherein the monopotassium $\alpha,\alpha'$-dinitrocyclic ketone is monopotassium 2,6-dinitrocyclohexanone, and the $\alpha,\omega$-dinitroalkane is 1,5-dinitropentane.

7. The process of claim 5 wherein the monopotassium $\alpha,\alpha'$-dinitrocyclic ketone is monopotassium 2,7-dinitrocycloheptanone and the $\alpha,\omega$-dinitroalkane is 1,6-dinitrohexane.

8. The process of claim 5 wherein the monopotassium $\alpha,\alpha'$-dinitrocyclic ketone in monopotassium 2,8-dinitrocyclooctanone and the $\alpha,\omega$-dinitroalkane is 1,7-dinitroheptane.

9. The process of claim 5 wherein the monopotassium $\alpha,\alpha'$-dinitrocyclic ketone is monopotassium 2,9-dinitrocyclononanone and the $\alpha,\omega$-dinitroalkane is 1,8-dinitrooctane.

10. The process of claim 5 wherein the monopotassium $\alpha,\alpha'$-dinitrocyclic ketone is monopotassium 2,10-dinitrocyclodecanone and the $\alpha,\omega$-dinitroalkane is 1,9-dinitrononane.

11. A process for the production of 1,4-dinitrobutane which comprises contacting monopotassium dinitrocyclopentanone with a strong mineral acid at temperatures ranging from about $-70°$ to about 85° C. to obtain a reaction mixture having a pH of from about 3 to about 8 and recovering the thus produced 1,4-dinitrobutane.

12. A process for the production of $\alpha,\omega$-dinitroalkanes having not less than 4 carbon atoms which comprises contacting a monopotassium $\alpha,\alpha'$-dinitrocyclic ketone with a sodium thiosulfate agent and recovering the thus produced $\alpha,\omega$-dinitroalkane.

No references cited.

CARL D. QUARFORTH, *Primary Examiner.*

REUBEN EPSTEIN, *Examiner.*